Figure 1:
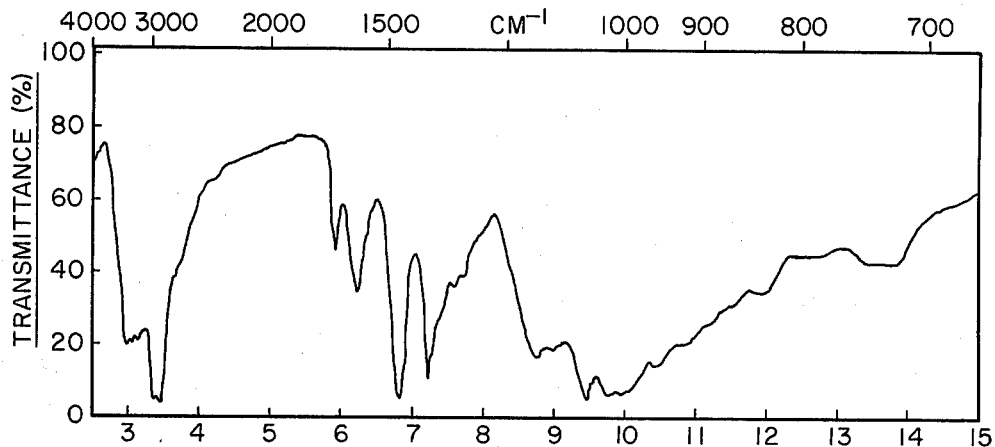

United States Patent [19]

Weinstein et al.

[11] 3,907,771

[45] Sept. 23, 1975

[54] ANTIBIOTIC 66-40

[75] Inventors: Marvin J. Weinstein, East Brunswick; George M. Luedemann, Glen Ridge; Gerald H. Wagman, East Brunswick, all of N.J.

[73] Assignee: Schering Corporation, Kenilworth, N.J.

[22] Filed: June 25, 1973

[21] Appl. No.: 373,064

Related U.S. Application Data

[63] Continuation-in-part of Ser. No. 112,368, Feb. 3, 1971, abandoned, which is a continuation-in-part of Ser. No. 797,304, Dec. 16, 1968, abandoned, which is a continuation-in-part of Ser. No. 740,742, June 27, 1968, abandoned.

[52] U.S. Cl............... 260/210 AB; 195/31; 195/80; 195/96; 260/210 K; 260/210 R; 424/180
[51] Int. Cl............................................. C07c 47/18
[58] Field of Search................... 260/210 AB, 210 K

[56] References Cited
UNITED STATES PATENTS

| | | | |
|---|---|---|---|
| 3,651,042 | 3/1972 | Marquez et al. | 260/210 AB |
| 3,753,973 | 8/1973 | Umezawa et al. | 260/210 AB |

*Primary Examiner*—Johnnie R. Brown
*Attorney, Agent, or Firm*—Carver C. Joyner; Stephen B. Coan; Raymond A. McDonald

[57] ABSTRACT

Antibiotic 66-40, a new broad spectrum antibiotic having an adverse effect upon the growth of gram-positive and gram-negative bacteria, is described together with its method of production via the fermentation of *Micromonospora inyoensis*, a new species of Micromonospora.

8 Claims, 2 Drawing Figures

US Patent    Sept. 23, 1975                                              3,907,771

INFRARED SPECTRUM OF
ANTIBIOTIC 66-40

NUCLEAR MAGNETIC RESONANCE SPECTRUM
OF ANTIBIOTIC 66-40

*INVENTORS:*
MARVIN J. WEINSTEIN
GEORGE M. LUEDEMANN
BY   GERALD H. WAGMAN

AGENTS

ANTIBIOTIC 66-40

This application is a continuation-in-part of copending application Ser. No. 112,368 now abandoned, filed Feb. 3, 1971, which in turn is a continuation-in-part of application Ser. No. 797,304, filed Dec. 16, 1968 (now abandoned), which in turn is a continuation-in-part of application Ser. No. 740,742, filed June 27, 1968 (now abandoned).

This invention relates to a new broad spectrum antibiotic designated Antibiotic 66-40 (sometimes referred to as sisomicin) which has an adverse effect upon the growth of gram positive and gram negative bacteria. The invention also relates to a microbiological method of its production, and to pharmaceutical compositions containing such antibiotic. The antibiotic may be prepared, isolated and used in its free form or in the form of its pharmaceutically acceptable functional derivatives.

Antibiotic 66-40 (sisomicin) is a biosynthetic elaborate obtained by cultivating an Antibiotic 66-40 producing strain of *Micromonospora* in an aqueous nutrient medium.

THE MICROORGANISM

The microorganism used according to this invention for the production of 66-40 has been named *Micromonospora inyoensis* (sometimes hereinafter referred to as *M. inyoensis*). The species was isolated from a soil sample taken from the Inyo National Forest in the White Mountains of California. One of its strain characteristics is its ability to produce Antibiotic 66-40. A culture of the living organism has been made a part of the permanent collection of the Northern Utilization and Research Division, Agricultural Research Service, U.S. Department of Agriculture, Peoria, Illinois where it has been assigned accession number NRRL 3292. Subcultures of *M. inyoensis* NRRL 3292 are readily available to the public from the foregoing Agency upon request. *M. inyoensis* is aerobic and grows well on the surface of a variety of solid and liquid nutrient media. It exhibits especially good growth and antibiotic production under submerged aerobic conditions. *M. inyoensis* is differentiable from other species of *Micromonospora* by a variety of taxonomical parameters. After 14 days of incubation at 24°–26°C on an agar medium comprising 3% NZ Amine Type A (Sheffield Chemical Company, Norwich, New York), 1% dextrose and 1.5% agar, growth is observed to be only fair to poor. Macroscopically, there is no apparent aerial mycelium. Occasionally a few well developed colonies appear late in the inoculation area. On some plates, a faint reddish brown diffusible pigment associated with the colonies is observed. In describing the color formations for this observation and others, the following system and references are employed: The color designations consist of two designators. The first is a color name taken from the "Descriptive Color Name Dictionary" by Taylor, Knoche and Granville published by the Container Corporation of America (1950) USA, with a color chip number corresponding to the color name, the chip number being taken from "The Color Harmony Manual," 4th Edition, 1958 published by the Container Corporation of America. The second designator consists of a color name and number which refers to the synonym or near synonym found in the National Bureau of Standards, Circular 553, November 1, 1955 (USA). The colony surface varies in color from Tile Red g5ne to strong brown 55 to brown mahogany m6pi. Microscopically the mycelium is long, branched, regular and non-septate as observed by phase contrast microscopy. The mycelium has a diameter of approximately 0.5 $\mu$. The spores are borne singly on simple sporophores of 1.0–1.5 $\mu$ in diameter. The spores are rough walled and ovoid to spherical in shape.

*M. inyoensis* grows well at 28°–37°C; no growth occurs at 50°C. On glucose asparagine-agar medium growth is poor. A growing colony of *M. inyoensis* will hydrolyze gelatin, milk, starch and reduce nitrate to nitrite when such tests are applied as according to Gordon et al. J. Bacteriology 69 : 147 (1956) and 73 : 15 (1957). Additionally, sucrose is utilizable as a carbon source.

Additional culture characteristics of *M. inyoensis* are set forth in Table I:

TABLE I

| Medium | Characteristics |
| --- | --- |
| Bennett's Agar | Growth moderate - Color: rust brown-g5pg; strong brown-55 |
| Emerson's Agar | Growth fair - Color: brick red-g6ng; moderate reddish brown-43 |
| Tomato Paste-Oatmeal Agar | Growth fair |
| Glucose Asparagine Agar | Growth poor |
| Glucose Yeast Extract Agar | Growth good - Color: rose brown-g7ni; Dark greyish red-20 (Faint maroon diffusible pigment produced by some colonies.) |
| Potato slice | Growth poor but improved when reagent grade calcium carbonate is added. |
| Czapek's Agar | Growth fair |
| Tyrosine Agar | Growth fair, no diffusible pigment |
| Peptone Iron Agar | Growth fair, no diffusible pigment |

*M. inyoensis* is capable of utilizing a variety of carbon and nitrogen sources. In Table II there is set forth observations on carbohydrate utilization. A visual estimate of the degree of growth is observed in a medium consisting of 0.5% yeast extract, 1% carbohydrate and 1.5% agar all in distilled water.

Table II

| CARBOHYDRATE UTILIZATION | |
| --- | --- |
| Carbohydrate in Medium | Growth |
| control | poor |
| L-arabinose | poor |
| D-glucose | good |
| D-galactose | fair to poor |
| β-lactose | fair to poor |
| D-levulose | poor |
| raffinose | poor |
| L-rhamnose | poor |
| starch | good |
| sucrose | good |
| D-xylose | fair to poor |
| inositol | poor |
| D-mannitol | poor |
| d(−)-arabinose | poor |
| dulcitol | poor |
| D-ribose | fair |
| α-melitiose | poor |
| D(+)-melizitose | poor |
| glycerol | poor |

In Table III, nitrogen utilization is set forth as determined by visual estimate of growth on agar plates in a medium consisting of 1% glucose, 1.5% agar, and a nitrogen source as indicated, all in distilled water.

TABLE III

| Nitrogen Source | Growth |
| --- | --- |
| 1% NZ Amine Type A | Fair to moderate |
| 0.5% yeast | good |
| 1% asparagine | poor |
| 1% glutamic acid | poor |
| 1% ammonium nitrate | poor |

THE ANTIBIOTIC

Antibiotic 66-40, the new compound of this invention, is produced when the elaborating microorganism, M. inyoensis is grown in an aqueous nutrient medium under submerged aerobic conditions. For limited amounts of antibiotic, surface culture in bottles or shake flasks can be employed. The organism is grown in a nutrient medium containing a carbon source, for example, an assimilable carbohydrate. An assimilable nitrogen compound or proteinaceous material is also required. Preferred carbon sources include glucose, maltose, mannose, sucrose, starch, corn starch and the like. Preferred nitrogen sources include corn steep liquor, yeast extracts, soybean meal, meat peptones, casein hydrolysates, beef extracts and the like. Combinations of these carbon and nitrogen sources can be used advantageously. It generally is not necessary to add trace elements since tap water is used in the formulation medium; however, addition of cobalt salts has been found to be advantageous.

Production of Antibiotic 66-40 can be effected at any temperature conducive to satisfactory growth of the microorganism, for example between 20° and 40°C, preferably 25°–35°C. Ordinarily optimum production is obtained in 3–7 days. The pH of the medium stays fairly close to 7 during the fermentation. The final pH is in part dependent on the buffers present, if any, and is advantageously adjusted to about 8.0 prior to sterilization. When growth is carried out in large vessels and tanks, it is desirable to produce a vegetative inoculum in a nutrient broth by inoculating the broth culture with a soil or slant culture or a lyophilized culture of the organism. When an active inoculum has been so obtained, it is transferred aseptically to larger vessels or tanks. The medium in which the vegetative inoculum is produced can be the same as or different from that utilized for the production of the antibiotic in tanks as long as good growth of the microorganism is obtained. After completion of the fermentation, the whole broth is adjusted to a pH of about 2 with mineral acid, preferably aqueous sulfuric acid, whereby the basic water-soluble antibiotic is released from the mycelium and dissolved in the aqueous fermentation medium. The entire mixture is filtered so as to remove the broth and the filtrate is neutralized followed by addition of oxalic acid to precipitate calcium ions. After an additional filtration and adjustment to neutrality, preferably with ammonium hydroxide, the clear neutralized filtrate is passed through an ion exchange resin, preferably of the IRC-50 Amberlite type in the ammonium form. Examples of the Amberlite type resins employed herein, both for anionic and cationic exchange, are found in the Handbook of Chemistry and Physics, 42nd Edition, Chemical Rubber Publishing Company, Cleveland, Ohio (1960). The spent broth is discarded, and Antibiotic 66-40 is eluted from the resin with ammonium hydroxide. The eluate is concentrated and evaporated to a residue consisting of crude Antibiotic 66-40 having a potency of about 500 mcg/mg according to the assay procedure hereinafter described. Purification of the crude antibiotic is effected by utilization of an anionic exchange resin, preferably Dowex 1 × 2 or an Amberlite IRA 401S type. The crude antibiotic is adsorbed from an aqueous solution onto the column and eluted therefrom with distilled water. Material obtained in this manner assays approximately 900 mcg/mg. Alternatively, crude Antibiotic 66-40 is purifiable by column chromatography on cellulose utilizing a solvent system of chloroform: Methanol: 17% ammonium hydroxide (2:1:1). The upper phase of the solvent system is used to first "wet" the column and the lower phase is used for elution purposes. The antibiotic is placed on the column by adsorption from a concentrated solution in the upper phase of the aforementioned solvent system.

In order to assay the various preparations for potency in terms of micrograms per milligrams of 66-40, the standard cylinder cup assay method is employed using Staphylococcus aureus ATCC 6538P as test organism. The method is completely analogous to that described by Oden et al., in Antimicrobial Agents and Chemotherapy (1963). One microgram of antibiotic activity of Antibiotic 66-40 is the amount of material which produces a zonal response of 16.3 ± 0.9 mm under the conditions of the assay method and is expressed as mcg/mg.

Chemical and Physical Properties of Antibiotic 66-40 Free Base

Antibiotic 66-40 (sisomicin) is a basic pseudo-oligosaccharide which is readily distinguished from other pseudo-oligosaccharides by its chemical structure, biological, physical and chemical properties as set forth herein. Based upon the physical and chemical data set forth below, Antibiotic 66-40 is believed to possess the following chemical structure, however, no stereochemical assignments are to be implied therefrom:

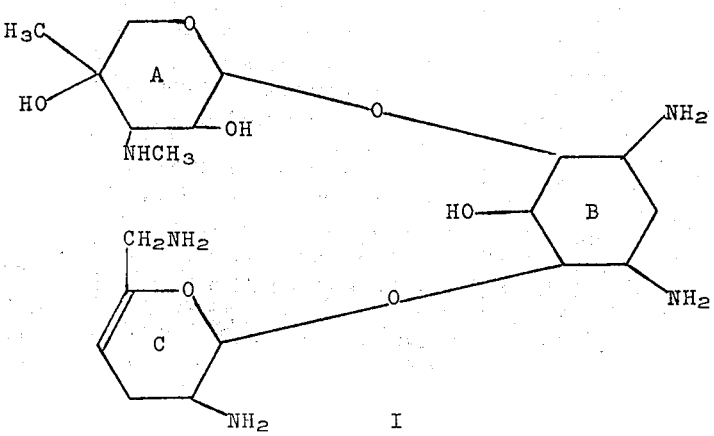

By the various analytical techniques used in the art the absolute stereochemistry of Antibiotic 66-40 and the chemical name therefor are as follows:

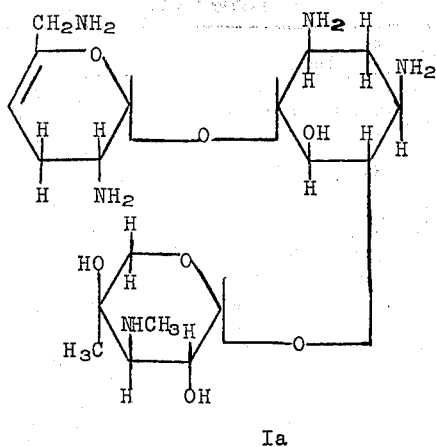

Ia

O-2,6-Diamino-2,3,4,6-tetra-deoxy-α-D-glycero-hex-4-enopyranosyl-(1 → 4)-O-[3-deoxy-4-C-methyl-3-(methylamino)-β-L-arabinopyranosyl-(1 → 6)]-2-deoxy-D-streptamine.

As mentioned before, this invention also relates to pharmaceutically acceptable functional derivatives of Antibiotic 66-40 (sisomicin). Exemplary of such derivatives are the solvates (hydrates), acid-addition salts, condensation products with aldehydes (i.e., Schiff bases and oxazolidines). These functional derivatives exhibit substantially the same antibiotic spectrum as Antibiotic 66-40, however, as would be expected, differences in solubility characteristics exist. Thus, the biological activity described hereinafter for Antibiotic 66-40 is also qualitatively applicable to its functional derivatives.

Some of these derivatives are described in detail below:

Antibiotic 66-40 being basic readily forms non-toxic salts with organic and inorganic acids, such as for example hydrochloric, sulfuric, phosphoric, acetic, stearic, propionic, tartaric, maleic, benzoic acid and the like. Also partly neutralized (e.g., neutralized with an inorganic base such as, for example, NaOH or with an organic base such as, for example, triethylamine) poly-basic acids can be used. In general, the mineral acid salts, such as those formed with hydrochloric acid, sulfuric acid, phosphoric acid and the like, are water soluble and may be obtained by concentration or lyophilization of an aqueous solution thereof or by precipitation with a water miscible organic solvent preferably a lower aliphatic alcohol or ketone. It is to be noted, however, that hydrochlorides of Antibiotic 66-40 exhibit substantial solubility in methanol and are, therefore, atypical. The hydrochlorides may be precipitated from an aqueous solution by the addition of a lower alkyl ketone, such as acetone. By titrating an aqueous solution of Antibiotic 66-40 with less than a stoichiometric amount of acid, it is possible to form partial acid addition salts. As used herein the term "acid addition salt" embraces all such compounds.

Antibiotic 66-40 and its acid addition salts form hydrates with water and solvates with organic solvents. Therefore, in the isolation procedures described herein Antibiotic 66-40 is obtained as a hydrate and its acid addition salts are obtained as solvates of lower aliphatic alcohols or ketones. The hydrates and solvates are relatively stable, therefore, the isolated products contain water or solvent, usually from about one-half to about one mole per mole of antibiotic.

Antibiotic 66-40 also forms non-toxic condensation products with aldehydes by procedures that are known in the art. The condensation products contemplated herein are represented by formula II below:

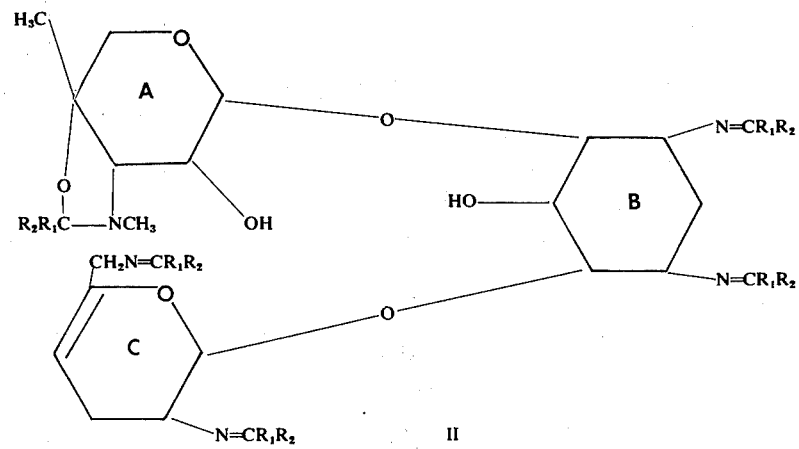

II wherein $R_1R_2C=$ is an alkylidene radical having up to 12 carbon atoms; a cycloalkylidine radical having up to 12 carbon atoms; an aralkylidine radical having up to 12 carbon atoms; or an aromatic radical including heterocyclic radicals having up to 12 carbon atoms. It is to be noted that the condensations occurring on ring B and ring C of Formula II form conventional Schiff base derivatives, whereas that occurring on ring A forms an oxazolidine ring.

The condensation products may be prepared by condensing Antibiotic 66-40 with aldehydes under known reaction conditions. Included among such aldehydes are aliphatic, cycloaliphatic, aromatic and hererocyclic compounds. Further, the aldehydes having an aryl nucleus may bear substituents such as hydroxy, halogen, nitro, lower alkoxy, trifluoromethyl and the like on said nucleus. Solely for illustration and without limitation, the following are among the aldehydes contemplated herein: acetaldehyde, propionaldehyde, butraldehyde, crotonaldehyde, furfural, cyclopentylacetaldehyde, vanillin, veratraldehyde, benzaldehyde, p-nitrobenzaldehyde, salicylaldehyde, pyridoxal and the like. These condensation products are not appreciably soluble in water but are soluble in most commonly used organic solvents such as chloroform, methanol, acetone, ethyl acetate and the like. Further, the condensation products are unstable in organic solvents containing traces of water and will revert to the free antibiotic. The presence of a trace amount of acid facilitates the reversion.

Antibiotic 66-40 has a characteristic infrared absorption spectrum in mineral oil (Nujol) as shown by FIG. 1. The more significant absorption bands are tabulated in Table VII with the following designations: S=strong, M=medium, W=weak, brd=broad, VS=very strong and VW=very weak.

Figure 2:
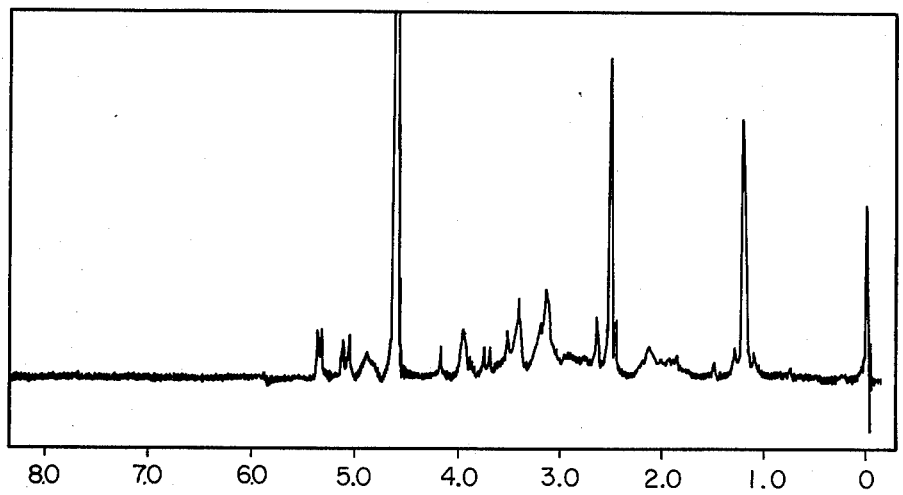

Antibiotic 66-40 also has a characteristic nuclear magnetic resonance spectrum as shown by FIG. 2. The NMR spectrum was obtained by the use of a Varian A-60-A spectrometer (Varian Associates, 611 Hansen Way, Palo Alto, California) on a solution (about 0.4 ml. about 20 mg/ml) of the antibiotic in deuterium oxide ($D_2O$). The spectrum is recorded in parts per million (PPM) from 3-(trimethylsilo)-propanesulfonic acid sodium salt, the internal standard.

Table VII

Significant Infrared Absorption Bands of Antibiotic 66-40

| | | |
|---|---|---|
| 2.98μ (M-S) | 6.82μ (nujol) | 10.46μ (M-S) |
| 3.05μ (M-S) | 7.25μ (nujol) | 11.97μ (M) |
| 3.16μ (M-S) | 8.77μ (M-S) | 12.75μ (VW,brd.) |
| 3.35μ-3.50μ (nujol) | 9.00μ (M-S) | 13.45-13.90μ |
| 5.93μ (W-M) | 9.47μ (S) | (W,brd) |
| 6.25μ (M) | 9.72-10.07μ (S, brd.) | |

In Table VIII is set additional data pertaining to qualitative tests on and physical constants of Antibiotic 66-40.

Table VIII

A. Color Reactions

| | |
|---|---|
| Sakaguchi | negative |
| Starch-Potassium Iodide | positive |
| Ninhydrin | positive |
| Stannous Chloride | negative |
| Molisch | negative |
| Biuret | positive |

B. Physical Constants

| | |
|---|---|
| Antibiotic 66-40 Base | |
| $[\alpha]_D^{26°}$ (C=0.3% in $H_2O$) | +188.9° |
| Melting Point (Monohydrate) | 185°–190°C |
| Melting Point (Hemihydrate) | 198°–201°C |
| Equivalent Weight | 92 |
| PKa | 8.0 |

| Elemental Analysis | Found | Calculated for a Monohydrate |
|---|---|---|
| C | 49.80 | 49.02 |
| H | 8.20 | 8.44 |
| N | 14.95 | 15.04 |
| O (by difference) | 27.05 | 27.50 |

Elemental analysis corresponds to the formula $C_{19}H_{37}N_5O_7 \cdot H_2O$
Molecular weight as determined by mass spectrometry 447.26
Ultra-violet absorption transparent in the range between 220–400 mμ

In Table IX is set forth the mass spectrum of Antibiotic 66-40 free base. In the table the columns headed m/e represent the mass to charge ratio and the column headed Rel. Int. stands for Relative Intensity and as the name implies sets forth the intensities of the peaks at the various mass to charge ratios (m/e), relative to that of the peak m/e = 118.

Table IX

Mass Spectrum of Antibiotic 66-40 Base

| m/e | Rel. Int. | m/e | Rel. Int. | m/e | Rel. Int. | m/e | Rel. Int. | m/e | Rel. Int. | m/e | Rel. Int. |
|---|---|---|---|---|---|---|---|---|---|---|---|
| 40 | 3.0 | 75 | 3.0 | 113 | 11.0 | 146 | 11.0 | 199 | 2.0 | 300 | 4.0 |
| 41 | 30.0 | 80 | 24.0 | 114 | 14.0 | 147 | 3.5 | 200 | 2.0 | 304 | 41.0 |
| 42 | 63.0 | 81 | 19.5 | 115 | 2.5 | 151 | 2.0 | 201 | 3.0 | 305 | 7.0 |
| 43 | 50.0 | 82 | 35.5 | 116 | 2.5 | 152 | 2.5 | 202 | 2.5 | 317 | 8.5 |
| 44 | >100% | 83 | 16.5 | 117 | 1.0 | 155 | 3.0 | 203 | 22.0 | 322 | 3.0 |
| 45 | 8.0 | 84 | 51.0 | 118 | 100(Base Pk.) | 156 | 2.0 | 205 | 6.0 | 330 | 5.0 |
| 46 | 5.0 | 85 | 21.0 | 119 | 8.0 | 157 | 2.5 | 206 | 6.0 | 331 | 2.0 |
| 51 | 2.5 | 86 | 58.0 | 120 | 2.0 | 158 | 4.5 | 215 | 6.0 | 332 | 23.0 |
| 52 | 3.5 | 87 | 28.0 | 121 | 2.0 | 159 | 3.5 | 216 | 2.0 | 333 | 4.0 |
| 53 | 10.0 | 88 | 11.0 | 122 | 2.0 | 160 | 98.0 | 219 | 2.0 | 350 | 5.0 |
| 54 | 10.0 | 92 | 7.0 | 123 | 2.0 | 161 | 9.5 | 220 | 2.0 | 362 | 15.0 |
| 55 | 20.0 | 93 | 6.0 | 124 | 3.0 | 162 | 2.0 | 236 | 7.0 | 363 | 3.0 |
| 56 | 50.0 | 94 | 15.0 | 125 | 6.0 | 163 | 20.0 | 237 | 2.0 | 411 | 0.5 |
| 57 | 23.5 | 95 | 7.0 | 126 | 20.0 | 164 | 2.0 | 238 | 6.0 | 412 | 0.6 |
| 58 | 64.0 | 96 | 10.0 | 127 | 35.0 | 168 | 2.0 | 239 | 2.0 | 414 | 0.5 |
| 59 | 40.0 | 97 | 15.0 | 128 | 12.0 | 169 | 3.5 | 245 | 4.0 | 429 | 0.9 |
| 60 | 13.5 | 98 | 23.0 | 129 | 5.0 | 170 | 2.5 | 246 | 6.0 | 430 | 4.5 |
| 65 | 4.0 | 99 | 11.0 | 130 | 15.0 | 173 | 19.0 | 253 | 2.5 | 431 | 1.0 |
| 66 | 3.5 | 100 | 44.0 | 131 | 2.5 | 174 | 3.0 | 254 | 4.5 | 447 | 5.0 |
| 67 | 12.0 | 101 | 14.0 | 133 | 2.0 | 176 | 3.0 | 255 | 2.5 | 448 | 1.3 |
| 68 | 65.5 | 102 | 17.0 | 135 | 2.0 | 178 | 7.0 | 256 | 10.0 | | |
| 69 | 21.0 | 107 | 3.0 | 138 | 2.0 | 185 | 2.0 | 270 | 2.0 | | |
| 70 | 19.0 | 108 | 7.5 | 140 | 3.0 | 186 | 2.5 | 271 | 11.0 | | |
| 71 | 30.0 | 109 | 17.0 | 142 | 16.0 | 187 | 17.0 | 272 | 6.0 | | |
| 72 | 66.0 | 110 | 50.0 | 143 | 3.5 | 188 | 2.5 | 282 | 5.0 | | |
| 73 | 66.0 | 111 | 13.0 | 144 | 6.0 | 191 | 32.0 | 289 | 4.5 | | |
| 74 | 28.0 | 112 | 19.0 | 145 | 65.0 | 192 | 3.5 | 299 | 9.0 | | |

C. Solubility of Antibiotic 66-40 Last in Various Solvents

| Solvent | Solubility* |
| --- | --- |
| Methanol | Sparingly soluble |
| Acetone | Insoluble |
| Chloroform | Slightly soluble |
| Ether | Insoluble |
| Benzene | Insoluble |
| Water | Very Soluble |

*Terminology is according to U.S. Pharmacopia XVIII, page 8.

Table X

Physical Constants of Antibiotic 66-40 Salts
Antibiotic 66-40 Hydrochloride as Methanol Solvate
$[\alpha]_D^{25}$(C=1% in H₂O)   +112.2°

| Elemental Analysis | Found | Calculated |
| --- | --- | --- |
| C | 37.70 | 36.29 |
| H | 7.15 | 7.00 |
| N | 10.61 | 10.58 |
| Cl | 25.60 | 26.78 |

Analysis corresponds to $C_{18}H_{37}N_5O_7 \cdot 5HCl \cdot CH_3OH$ Ultra-violet absorption-transparent in the range between 220–400 mμ

Antibiotic 66-40 Sulfate as Methanol Solvate
$[\alpha]_D^{25}$(C=1% in H₂O)   +105.1

| Elemental Analysis | Found | Calculated |
| --- | --- | --- |
| C | 32.52 | 33.14 |
| H | 6.33 | 6.39 |
| N | 9.32 | 9.66 |
| SO₄ | 33.90 | 33.13 |

Analysis corresponds to $(C_{19}H_{37}N_5O_7)_2 \cdot 5H_2SO_4 \cdot 2CH_3OH$ Ultra-violet absorption-transparent in the range between 220–400 mμ.

The following examples are illustrative of fermentation and isolation procedures yielding Antibiotic 66-40:

EXAMPLE 1

Tank Fermentation of Micromonospora inyoensis

Germination Stage 1:

Under aseptic conditions, add a lyophilized culture (or cells obtained from a slant culture) of *M. inyoensis* to a 300 ml. shake flask containing 100 ml. of the following sterile medium:

| | |
| --- | --- |
| Beef extract | 3 g. |
| Tryptone | 5 g. |
| Yeast extract | 5 g. |
| Dextrose | 1 g. |
| Starch | 24 g. |
| Calcium carbonate | 2 g. |
| Tap water | 1000 ml. |

Incubate the flask and its contents for five days at 35°C. on a rotary shaker (280 r.p.m., 2 inch stroke).

Germination Stage 2:

Aseptically transfer 25 ml. of the fermentation medium of germination stage 1 to a two-liter shake flask containing 500 ml. of the aforedescribed sterile germination medium. Incubate the flask and its contents for three days at 28°C. on a rotary shaker (280 r.p.m., 2 inch stroke).

Fermentation Stage

Aseptically transfer 500 ml. of the medium obtained from germination stage 2 to a 14 l. fermentation tank containing 9.5 l. of the following sterile medium:

| | |
| --- | --- |
| Dextrin | 50 g. |
| Dextrose | 5 g. |
| Soybean meal | 35 g. |
| Calcium carbonate | 7 g. |
| Cobalt chloride | $10^{-6}$ molar |
| Tap water | 1000 ml. |
| Antifoam (GE 60) | 10 ml. |

Prior to sterilizing the aforedescribed medium, adjust the pH to 8. Aerobically ferment for 66–90 hrs. while stirring at 250 r.p.m. with air input at 4.5 liters per l./minute and 25 lbs. p.s.i. The potency of the antibiotic produced at the end of this period reaches a peak of 150–225 mcg/ml. and remains relatively constant. The pH of the fermentation medium changes slightly during the antibiotic production, varying in the range of 6.8–7.3.

EXAMPLE 2

Isolation of Antibiotic 66-40

The whole broth from Example 1 is adjusted to pH 2 with 6N sulfuric acid. (For the purpose of this example, quantities are given in terms of 170 liters of fermentation broth obtained by pooling acidified broths from 17 batches obtained according to the procedure of Example 1). The acidified broth is stirred for about 15 minutes and then filtered. Wash the mycelium with water and combine the washings with the filtrate. Adjust the pH of the filtrate to 7 with 6N ammonium hydroxide. To the neutralized filtrate, add sufficient oxalic acid to precipitate calcium and filter. Reneutralize the filtrate with ammonium hydroxide. Charge the filtrate onto a cationic exchange adsorption column containing 1500–2000 g. of IRC-50 Amberlite in its ammonium form. Discard the eluate, wash the resin with water, and elute with 2N ammonium hydroxide. Collect 400 ml. fractions and monitor by disc testing with *S.aureus* ATTC 6538P. Combine active fractions and evaporate to dryness under vacuum obtaining about 28 g. of crude Antibiotic 66-40 having an activity of about 500 mcg/g.

EXAMPLE 3

Purification of Antibiotic 66-40

Dissolve 28 g. of crude Antibiotic 66-40 obtained in Example 2 in 100 ml of distilled water and charge to an anion exchange adsorption column (Dowex 1×2) in the hydroxyl form. Slurry 2,000 g. of the resin in water into a column 2½ inches in diameter and 36 inches high. Elute the column with distilled water at a rate of about 23 ml/min. collecting 100 ml. fractions and monitor with a conductivity meter and by disc testing against *Staphylococus aureus*. The disc testing provides a gross separation of antibiotic-containing eluate fractions from those devoid of antibiotic. To insure that the fractions are properly combined, a portion of each fraction is paper chromatographed using the lower phase of a chloroform; methanol; 17% ammonium hydroxide system (2:1:1). Each paper is sprayed with ninhydrin and the eluates containing like material are combined and lyophilized yielding about 5.7 g. of antibiotic 66-40 assaying about 900 mcg/mg.

EXAMPLE 4

Preparation of Antibiotic 66-40 Sulfate

Dissolve 3.9 g. of 66-40 base prepared as described in Example 3 in 60 ml. of water and adjust the pH to 4.5 with 6N sulfuric acid. Stir the solution with decolorizing charcoal for about one-half hour and filter. Add the filtrate to about 1 liter of methanol. Filter and dry obtaining 4.8 g. of the sulfate salt; assay about 640 mcg/mg.

EXAMPLE 5

Alternate Purification of Antibiotic 66-40 Via Its Sulfate

200 G. of Whatman No. 1 cellulose powder is mixed with 20 ml. of the top phase of a solvent system composed of chloroform: methanol: 17% ammonium hydroxide (2:1:1) and packed in small segments in a column having an inner diameter of one-fourth inch and a height of 20 inches. The lower phase of the solvent system is run through the column until a yellow band of impurities emerges. Two grams of 66-40 sulfate prepared as described in Example 4 is dissolved in about 3 ml. of the upper solvent phase, mixed with some cellulose powder, dried under vacuum and packed atop the cellulose column. Lower phase is allowed to run through the column at the rate of 1 ml. per minute collecting 5 ml. fractions every 15 minutes.

Aliquots of each fraction were spotted on filter paper and tested with ninhydrin reagent to determine the presence or absence of antibiotic. Paper chromatography of the antibiotic-containing fractions established that the desired material was located between fractions 121 to 190.

Fractions 121 to 190 are combined, evaporated to dryness, redissolved in water, and passed through IRA 401S (an anion exchange resin) in the hydroxyl cycle. The pH of the eluate is adjusted to 4.5 with sulfuric acid and treated with charcoal, filtered and concentrated to a smaller volume. The concentrate is added to an excess amount of methanol and the white precipitate that is formed is separated by filtration. The precipitate is dissolved in water and passed through an IRA 401S resin column in the hydroxyl form. The effluent is collected, concentrated and lyophilized, yielding about 300 mg. of 66-40 base having an assay of about 1000 mcg/mg.

EXAMPLE 6

Preparation of Antibiotic 66-40 Hydrochloride

Dissolve 104.7 mg. of 66-40 base, prepared as described in Example 2 in 4 ml. of water and adjust the pH to 4.5 with hydrochloric acid. Evaporate the solution to dryness and redissolve the residue in methanol. Add this solution to excess acetone and filter the resulting precipitate obtaining 130 mg. of 66-40 hydrochloride; assaying at 753 mcg/mg.

EXAMPLE 7

Preparation of Crystalline Antibiotic 66-40 Monohydrate

Prepare a (26 × 2.5 cm) silica gel chromatographic column using the lower (organic) phase of a solvent mixture consisting of isopropanol: $CHCl_3$: ammonium hydroxide in the volume ratio of 1:2:1 as the developer/eluent. Dissolve 1.0 gram of 66-40 base in 5.0 ml. of solvent mixture. Adsorb the antibiotic solution to the silica gel and chromatograph. Collect 5.0 ml. fractions and determine the location of the desired fractions by thin-layer chromatography on silica gel plates. Combine and evaporate the appropriate (44-78) fractions in vacuo and obtain thereby a pale yellow syrup which upon azeotropic distillation with ethanol crystallizes as pale yellow rosettes. The product obtained in this manner is 66-40 monohydrate which melts at about 185°–190°C. The yield is about 650 mgs.

EXAMPLE 8

Preparation of Benzaldehyde Condensation Product of Antibiotic 66-40

5.0 g. of Antibiotic 66-40 in 60 ml. absolute ethanol is treated with 5.9 g. benzaldehyde (slight excess over 5 equivalents) and refluxed for 1 hour. The solution is cooled and filtered affording 7.0 g. of a white crystalline solid, m.p. 123°–126°C. $[\alpha]_D^{26} = +43.2°$ (C = 0.3% in $CHCl_3$). Elemental analysis indicates five benzaldehyde residues which by analogy with Formula II would have the following structural formula without stereochemical assignments:

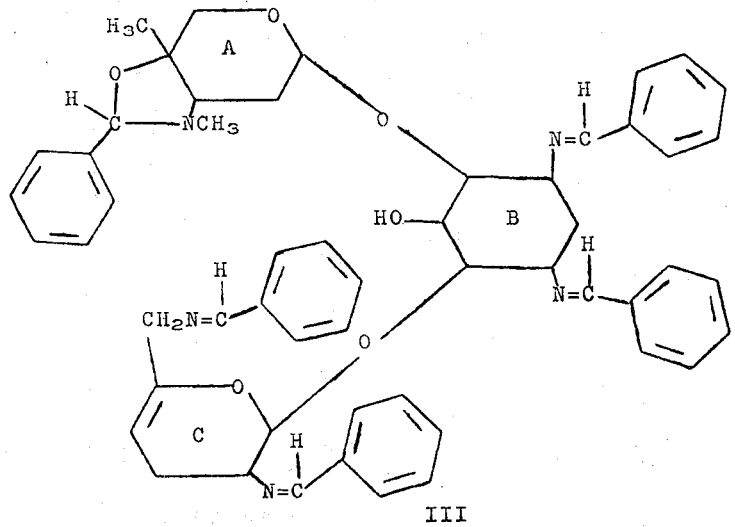

III

Similarly, by replacing the benzaldehyde reactant in the foregoing example with an equivalent quantity of any one of the following aldehydes
acetaldehyde,
furfural,
cyclopentylacetaldehyde,
crotonaldehyde,
vanillin,
veratraldehyde,
pyridoxal,
salicylaldehyde,
p-bromobenzaldehyde,
p-nitrobenzaldehyde, cinnamaldehyde,
butraldehyde,
and by following substantially the procedure set forth in Example 8, the corresponding aldehyde condensation products may be obtained.

Biological Properties of Antibiotic 66-40

Antibiotic 66-40 and its non-toxic pharmaceutically acceptable derivatives possess a broad antibacterial spectrum. The antibiotic has the property of adversely affecting the growth of gram positive and gram negative bacteria and thus can be used alone or in combination with other antibiotic agents to prevent the growth of or reduce the number of bacteria in various environments. It may be used, for example, to disinfect laboratory glassware, dental and medical equipment contaminated with *Staphylococcus aureus* or other bacteria whose growth is adversely affected by Antibiotic 66-40. Because of its particularly effective activity against gram negative bacteria, it is useful in combatting infections causesd by such gram negative organisms, for example, species of *Proteus* and *Pseudomonas*. The antibiotic has a veterinary application, particularly in the treatment of mastitis in cattle and *Salmonella* induced diarrheas in domestic animals such as dogs and cats. The in vitro activity of Antibiotic 66-40 against a variety of gram positive and gram negative bacteria is set forth in Table IV. The minimal inhibitory concentration (MIC) was determined utilizing yeast beef broth as the test medium. A two fold serial dilution technique was employed. The MIC is the mid-point between the last clear tube and the first turbid tube determined by visual observation. Determinations were made using a $10^{-3}$ dilution of a 24 hour broth culture of the test bacteria. All tubes were incubated for 18 hours at 37°C. In the table, Antibiotic 66-40 having a potency of 1000 mcg/mg. was used for the study.

Table IV

| In Vitro Activity of Antibiotic 66-40 Microorganism | MIC |
|---|---|
| Gram-Positive Bacteria | mcg/ml |
| *Diplococcus pneumoniae* DA 150[1] | 3.0 |
| *Enterococcus* sp. DA 800 | 2.25 |
| *Enterococcus* sp. DA 801 | 2.25 |
| *Enterococcus* sp. DA 802 | 2.25 |
| *Staphylococcus aureus* ATCC 6538P | 0.23 |
| *Staphylococcus aureus* ATCC 11631 | 0.21 |
| *Staphylococcus aureus* Gray | 0.05 |
| *Staphylococcus aureus* DA 2033 | 0.08 |
| *Streptococcus faecalis* ATCC 10541 | 3.0 |
| *Streptococcus pyogenes* DA 1 | 3.0 |
| *Streptococcus pyogenes* DA 21 | 3.7 |
| *Streptococcus pyogenes* DA 15 | 3.7 |
| Gram-Negative Bacteria | |
| *Escherichia coli* ATCC 10536 | 0.6 |
| *Escherichia coli* DA 3 | 0.3 |
| *Escherichia coli* DA 4 | 0.6 |
| *Escherichia coli* DA 1 | 0.6 |
| *Klebsiella pneumoniae* DA 20 | 0.23 |
| *Klebsiella pneumoniae* ATCC 10031 | 3.0 |
| *Proteus vulgaris* DA 121 | 0.6 |
| *Proteus vulgaris* ATCC 9921 | 0.6 |
| *Proteus vulgaris* DA 13 | 0.3 |
| *Proteus vulgaris* DA 12 | 3.0 |
| *Pseudomonas aeruginosa* ATCC 8709 | 0.45 |
| *Pseudomonas aeruginosa* ATCC 8689 | 0.6 |
| *Pseudomonas aeruginosa* ATCC 9027 | 0.6 |
| *Salmonella scnottmeulleri* DA 10 | 0.53 |
| *Salmonella* sp. DA 101 | 0.3 |
| *Salmonella* sp. DA 102 | 0.3 |
| *Aerobacter* sp. DA 3a | 0.3 |

[1]DA refers to Schering Corporation collection number.

The acute toxicity of Antibiotic 66-40 in the form of its sulfate was determined in the standard manner by a variety of routes in mice weighing 18–20 grams. The toxicity data given in Table V is expressed in terms of the free base.

Table V

| Actue Toxicity of Antibiotic 66-40 | |
|---|---|
| Mode of Administration | $LD_{50}$(mg/kg.) |
| subcutaneous | 288 |
| intraperitoneal | 221 |
| intravenous | 34 |

Antibiotic 66-40 exhibits an antibacterial action against pathogenic bacterial infections induced in laboratory animals and in particular in the mouse. To determine the in vivo protective activity of Antibiotic 66-40 against infections of pathogenic bacterial origin in mice, mice were dosed twice with the antibiotic, once immediately before an intraperitoneal injection of the infecting bacteria and once 4 hours after such injection. The number of survivors was determined 48 hours after infection and that data analyzed by standard probit procedures to determine $PD_{50}$ values with 95% confidence limits. Table VI sets forth the protective activity of Antibiotic 66-40 against various pathogenic bacteria.

Table VI

| Protective Activity of Antibiotic 66-40 in Mice | | |
|---|---|---|
| Organism | Route of Administration | $PD_{50}$(mg/kg) |
| *Staphylococcus aureus* Gray DC 445 | subcutaneous | 0.12 |
| | oral | 25.0 |
| *Streptococcus pyogenes* C DC 28 | subcutaneous | 0.87 |
| *Klebsiella pneumoniae* DC 801 | subcutaneous | 0.70 |
| | oral | 50.0 |
| *Pseudomonas aeruginosa* ATCC 8709 | subcutaneous | 1.12 |
| *Salmonella paratyphi* B DC 837 | subcutaneous | 1.91 |

It is evident from Table VI that the therapeutic index ($LD_{50}/PD_{50}$) via the subcutaneous route ranges from 330 to 2400 with regard to the Gram-positive organisms and 150 to 410 with regard to the Gram-negative organisms.

In addition, mice infected intraperitoneally with eight $LD_{50}$ doses of *Rickettsia akaria* were afforded 100% protection by the subcutaneous administration of 2 mg. of Antibiotic 66-40 administered once a day for four days.

In view of the foregoing in vivo data and especially in view of the favorable therapeutic index exhibited by Antibiotic 66-40, it is evident that the antibiotic may be used to control and treat a variety of infections in mammalian hosts. Among such infections are those caused by species of such organisms as *Streptococcus*, *Staphylococcus*, *Straptococcus*, *Eschericnia*, *Salmonella*, *Klebsiella* and the like. The foregoing organisms cause or are suspected of causing bovine mastitis, urinary tract infections and diarrhea. Species of the same organisms are suspected of causing skin and upper respiratory diseases or of aggravating pre-existing manifestations of such diseases in mammals. Antibiotic 66-40, therefore, provides a potent weapon for combatting such organisms and disease states caused thereby.

Antibiotic 66-40 may be applied topically in the form of ointments, both hydrophilic and hydrophobic, in the form of lotions which may be aqueous, non-aqueous or of the emulsion type or in the form of creams. Pharmaceutical carriers useful in the preparation of such formulations will include, for example, such substances as water, oils, greases, polyesters, polyols and the like. The Schiff base-oxazolidine derivatives are of particular advantage for preparing non-aqueous topical formulations since such derivatives exhibit compatability with the pharmaceutical carriers generally used in such preparations.

In general, the topical preparations will contain from about 0.1 to about 3.0 gms. of antibiotic per 100 gms. of ointment, cream or lotion. The topical preparations are usually applied gently to lesions from about 2 to about 5 times a day.

The antibiotics of the instant invention may be utilized in liquid form such as solutions, suspensions and the like for otic and optic use and may also be administered parenterally via intramuscular injection. The injectable solution or suspension will usually be administered at from about 1 mg. to about 5 mgs. of antibiotic per kilogram of body weight per day divided into about 2 to about 4 doses. The precise dose depends on the stage and severity of the infection, the susceptibility of the infecting organism to the antibiotic and the individual characteristics of the animal species being treated.

Example 9 below sets forth the ingredients and the process for making an injectable solution.

| Example 9 Injectable Solution | Per 2.0 ml. Vial | Per 50 liters |
|---|---|---|
| Antibiotic 66-40 sulfate | 84.0 mgs.* | 2100.0* gms |
| Methylparaben, USP | 3.6 mgs. | 90.0 gms. |
| Propylparaben, USP | 0.4 mgs. | 10.0 gms. |
| Sodium bisulfite, USP | 6.4 mgs. | 160.0 gms. |
| Disodium Ethylenediamine tetraacetate Dihydrate, R.G. | 0.2 mgs. | 5.0 gms. |
| Water for injection, USP q.s. add | 2.0 ml. | 50.0 liters |

*Includes a 5% manufacturing overcharge

Procedure: For a 50.0 liter batch

Charge approximately 35 liters of water for injection to a suitable stainless steel jacketed vessel and heat to about 70°C. Charge the methylparaben and propylparaben to the heated water for injection and dissolve with agitation. When the parabens are completely dissolved, cool the contents of the tank to 25°–30°C by circulating cold water through the tank jacket. Sparge the solution with nitrogen gas for at least 10 minutes and keep covered with nitrogen during subsequent processing. Charge and dissolve the disodium EDTA and sodium bisulfite. Charge and dissolve the 66-40 sulfate. Bring the batch volume up to 50.0 liters with water for injection and agitate until homogenous.

Under sterile conditions, filter the solution through a suitable bacteria retentive filter collecting the filtrate in a filling tank.

Fill the produce aseptically into sterile pyrogen free multiple dose vials, stopper and seal.

| Example 10 Antibiotic Ointment | |
|---|---|
| Antibiotic 66-40 base | 10 gms. |
| Petrolatum | 990 gms. |

Procedure
1. Melt the petrolatum.
2. Admix Antibiotic 66-40 base with about 10% of the molten petrolatum.
3. Pass the antibiotic - petrolatum mixture through a colloid mill.
4. Add in the remainder of the petrolatum and cool the mixture until it becomes semi-solid. At this stage the product may be put into suitable containers.

| Example 11 Antibiotic Ointment | |
|---|---|
| Antibiotic 66-40 Benzaldehyde condensation product (See Example 8) | 20 gms. |
| Petrolatum | 980 gms. |

Procedure

Follow the procedure of Example 10 to obtain a product containing the equivalent of about 10 gms. of Antibiotic 66-40 as the free base.

We claim:

1. A member selected from the group consisting of sisomicin, non-toxic acid addition salts, including solvates thereof, and condensation products of sisomicin with aldehydes having up to 12 carbon atoms; said sisomicin being a solid composition of matter having:
   a. a molecular weight of 447.26 as determined by mass spectrometry;
   b. the empirical formula $C_{19}H_{37}N_5O_7$;
   c. a specific optical rotation as measured by the D line of sodium at 26° of +188.9° in water at 0.3% concentration;
   d. an infrared absorption spectrum in mineral oil substantially as shown in FIG. 1; and
   e. a nuclear magnetic spectrum in deuterium oxide as shown in FIG. 2; said sisomicin having the following formula:

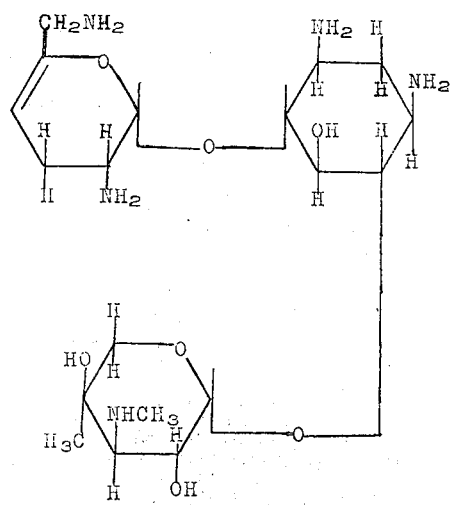

2. A compound of claim 1, said compound being sisomicin monohydrate in its essentially pure crystalline form.

3. A compound of claim 1, said compound being sisomicin.

4. A compound of claim 1, said compound being a nontoxic acid addition salt of sisomicin.

5. A compound of claim 4, said compound being sisomicin hydrochloride.

6. A compound of claim 4, said compound being sisomicin sulfate.

7. A compound of claim 1 of the formula:

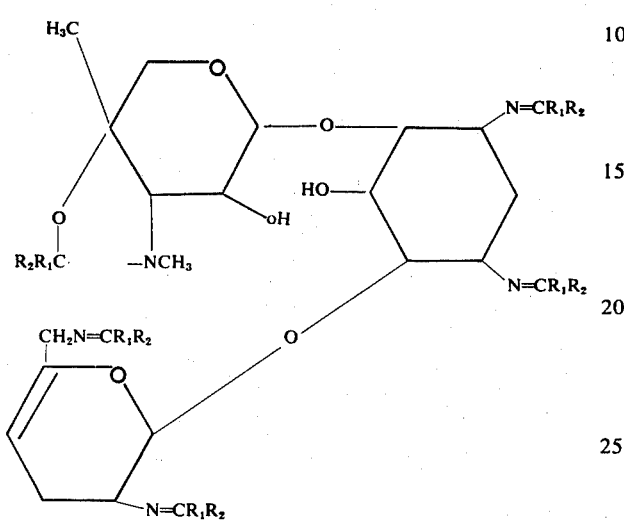

wherein $R_2R_1C=$ is alkylidene containing up to 12 carbon atoms; cycloalkylidene containing up to 12 carbon atoms; aralkylidene containing up to 12 carbon atoms; or aromatic including heterocyclic containing up to 12 carbon atoms.

8. A compound of claim 7 wherein $R_1R_2C=$ is a benzylidene radical, said compound having the formula:

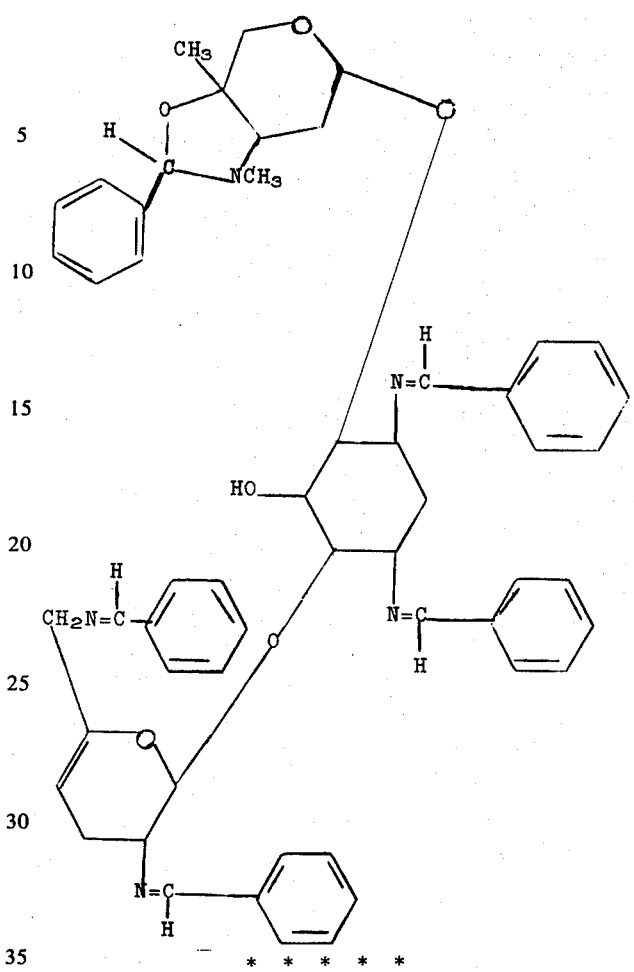

* * * * *